(12) United States Patent
Allen

(10) Patent No.: US 7,433,302 B2
(45) Date of Patent: Oct. 7, 2008

(54) ETHERNET NETWORK IMPLEMENTING REDUNDANCY USING A SINGLE CATEGORY 5 CABLE

(75) Inventor: Robert J. Allen, Racine, WI (US)

(73) Assignee: Micrel, Inc., San Jose, CA (US)

( * ) Notice: Subject to any disclaimer, the term of this patent is extended or adjusted under 35 U.S.C. 154(b) by 694 days.

(21) Appl. No.: 11/123,325

(22) Filed: May 4, 2005

(65) Prior Publication Data
US 2006/0250947 A1  Nov. 9, 2006

(51) Int. Cl.
*H04J 3/02* (2006.01)
*G06F 15/16* (2006.01)

(52) U.S. Cl. .................. 370/224; 370/216; 370/249; 370/908; 370/910; 709/250

(58) Field of Classification Search .................. 370/216, 370/217, 219, 221, 223, 224, 225, 241, 242, 370/244, 249, 256, 258, 908, 910; 709/250; 714/716, 717
See application file for complete search history.

(56) References Cited
U.S. PATENT DOCUMENTS

| | | | |
|---|---|---|---|
| 5,414,708 A * | 5/1995 | Webber et al. | 370/445 |
| 5,747,893 A * | 5/1998 | Bennett et al. | 307/100 |
| 6,133,846 A | 10/2000 | Birkedahl et al. | |
| 6,178,178 B1 | 1/2001 | Wallace et al. | |
| 6,272,552 B1 * | 8/2001 | Melvin et al. | 709/250 |
| 6,282,669 B1 | 8/2001 | Imanaka et al. | |
| 6,430,151 B1 | 8/2002 | Glas et al. | |

2002/0064163 A1 * 5/2002 Fujiyama et al. ............ 370/400
(Continued)

FOREIGN PATENT DOCUMENTS
EP  0 557 019 A2  8/1993
(Continued)

OTHER PUBLICATIONS

Juniper Networks, Inc., Create a Loopback Plug for an RJ-45 Ethernet Interface, Apr. 22, 2003, Juniper Networks, Inc., http://web.archive.org/web/20030422232535/http://www.juniper.net/techpubs/software/nog/nog-interfaces/html/fe-ge-loopback25.html.*

(Continued)

*Primary Examiner*—Benny Q. Tieu
*Assistant Examiner*—Hoon J Chung
(74) *Attorney, Agent, or Firm*—Patent Law Group LLP; Carmen C. Cook

(57) ABSTRACT

A method for providing redundancy in a daisy chain local area network employing Category 5 cabling for connecting network devices uses the normally unused twisted wire pairs in the single Cat 5 cable connecting adjacent network devices. The method includes forming in each network device a passive signal path connecting pins of an upstream port associated with the normally unused twisted wire pairs of the Cat 5 cable to pins of a downstream port associated with the normally unused twisted wire pairs of the Cat 5 cable, forming loop back connections at the terminal network devices where the loop back connections connect the normally used twisted wire pairs to the normally unused twisted wire pairs of the Cat 5 cable connected to the terminal network devices, and implementing a Spanning Tree Protocol in each of the network devices for defining an active signal path through the local area network.

20 Claims, 3 Drawing Sheets

U.S. PATENT DOCUMENTS

2004/0225739 A1* 11/2004 Ruhnow .................. 709/227
2004/0235469 A1* 11/2004 Krug ..................... 455/431

FOREIGN PATENT DOCUMENTS

WO        02/49271 A2    6/2002

OTHER PUBLICATIONS

European Search Report, 6 pages.
"Integrated 3-Port 10/100 Managed Switch with PHY", KS8993M/ML/MI Product Brief, Micrel Data Sheet, 2 pages.
"Integrated 5-Port 10/100 Managed Switch", KS8995MA Product Brief, Micrel Data Sheet, 4 pages.

* cited by examiner

ETHERNET NETWORK IMPLEMENTING REDUNDANCY USING A SINGLE CATEGORY 5 CABLE

FIELD OF THE INVENTION

The invention relates to data communication networks and, in particular, to a method for implementing redundancy in a daisy chain local area network using a single Category 5 cable between the network devices.

DESCRIPTION OF THE RELATED ART

Data communication networks, such as local area networks, are well known in the art for use in interconnecting network devices to facilitate data communication between two or more network devices. Ethernet, described by IEEE standard 802.3, is one of the most commonly used local area networking scheme and incorporates a variety of cabling schemes. For instance, in a 10Base-T Ethernet or 100Base-TX Ethernet, Category 5 (Cat 5) wiring is used. A Cat 5 cable is a unshielded twisted pair cable containing four twisted wire pairs. Fast Ethernet (100Base-TX) uses only two of the four pairs, leaving two pairs unused. The Cat 5 cables are connected to network devices using RJ45 connectors.

A common configuration for a 10Base-T or 100Base-TX Ethernet is a daisy chain environment where multiple network devices are interconnected serially with adjacent network devices connected using a single Cat 5 cable. FIG. 1 illustrates a conventional daisy chain Ethernet environment where a number of network devices are daisy-chained together to enable data communications to flow between the start node (network device A) and the end node (network device N). Each pair of adjacent network devices is connected using a single Cat 5 cable (2, 3). The daisy chain Ethernet environment is commonly used in an assembly line where the network devices form multiple drops along the network to equipments 4 for providing control signals to or collecting data from the assembly line equipments.

A major drawback in the use of 10Base-T/100Base-TX daisy chain Ethernet is the lack of redundancy. If one network device fails, then all network devices downstream from the failed device will lose connectivity to the upstream device. The lack of redundancy makes daisy chain Ethernet not a viable alternative to traditional approaches such as multi-drop serial links formed using RS-485.

A known solution to implement redundancy in a daisy chain Ethernet architecture is to add a Category 5 cable, such as cable 5 in FIG. 1, between the end node and the start node to create a loop and implement IEEE 802.1d Spanning Tree Protocol (STP). When the network is configured as shown in FIG. 5, if any one network device fails, STP will select the alternate path (such as cable 5) to re-establish communications with the remaining downstream devices. However, in many applications, it is important to use as few cables as possible and thus the extra Cat 5 cable required for redundancy is highly undesirable. In addition, when new network devices are to be added to the network, one needs to ensure that the redundant cable is long enough to reach between the start node and the new end node. A longer redundant cable may be required to be installed when adding new network devices to the chain, making scalability difficult.

An improved method for providing redundancy in a daisy chain local area network is desired.

SUMMARY OF THE INVENTION

According to one embodiment of the present invention, a daisy chain local area network employing Category 5 (Cat 5) cabling for connecting network devices implements redundancy using the normally unused twisted wire pairs in the single Cat 5 cable connecting each adjacent pair of network devices. In particular, the local area network provides communications over two twisted wire pairs (the "normally used" twisted wire pairs) of the Cat 5 cabling connecting the network devices, leaving two twisted wire pairs of the Cat 5 cabling unused (the "normally unused" twisted wire pairs). The daisy chain local area network includes multiple network devices connected in a daisy chain configuration between first and second terminal network devices. The first and second terminal network devices are network devices at the two ends of the daisy chain of network devices. Each adjacent pair of network devices and terminal network devices is connected by a single Cat 5 cable. Each of the multiple network devices includes an upstream port and a downstream port where each port is coupled to a Cat 5 cable. Each of the ports has pins associated with the normally used twisted wire pairs and the normally unused twisted wire pairs of the Cat 5 cable. Each of the multiple network devices further includes a passive signal path connecting the pins of the upstream port associated with the normally unused twisted wire pairs of the Cat 5 cable to the pins of the downstream port associated with the normally unused twisted wire pairs of the Cat 5 cable.

The local area network further includes a loop back connection coupled to each of the first and second terminal network devices. The loop back connection is operative to electrically connect the normally used twisted wire pairs to the normally unused twisted wire pairs of the Cat 5 cable connected to the respective first and second terminal network devices. The passive signal paths through the multiple network devices and the loop back connections of the first and second terminal network devices form a redundancy loop in the local area network. A Spanning Tree Protocol is implemented in each of the multiple network devices and the first and second terminal network devices for defining an active signal path through the local area network.

In one embodiment, a passive loop back method is used where by a loop back connector is coupled to a first port of one of the terminal network device not coupled to the Cat 5 cable. The loop back connector connects the pins of the first port associated with the normally used twisted pairs of a Cat 5 cable to the pins of the first port associated with the normally unused twisted pairs of a Cat 5 cable. In another embodiment, an active loop back method is used whereby the loop back connection is realized using a multi-port switching device.

According to another aspect of the present invention, a method for providing redundancy in a daisy chain local area network employing Category 5 (Cat 5) cabling for connecting network devices uses the normally unused twisted wire pairs in the single Cat 5 cable connecting each adjacent pair of network devices. In particular, the local area network provides communications over two twisted wire pairs (the "normally used" twisted wire pairs) of the Cat 5 cabling connecting the network devices, leaving two twisted wire pairs of the Cat 5 cabling unused (the "normally unused" twisted wire pairs). The method includes providing multiple network devices connected in a daisy chain configuration between first and second terminal network devices where the first and second terminal network devices are network devices at the two ends of the daisy chain of network devices. Each adjacent pair of network devices and terminal network devices is connected by a single Cat 5 cable. The method then includes forming in each of the multiple network devices a passive signal path connecting pins of an upstream port of the respective network device associated with the normally unused twisted wire pairs of the Cat 5 cable to pins of a downstream port of the respective network device associated with the normally unused twisted wire pairs of the Cat 5 cable, and forming a loop back connection at each of the first and second terminal network devices where the loop back connection is operative to electrically connect the normally used twisted wire pairs to the normally unused twisted wire pairs of the Cat 5 cable connected to the respective first and second terminal network devices. Finally, the method includes implementing a Spanning Tree Protocol in each of the multiple network devices and the first and second terminal network devices for defining an active signal path through the local area network.

The present invention is better understood upon consideration of the detailed description below and the accompanying drawings.

DETAILED DESCRIPTION OF THE PREFERRED EMBODIMENTS

Figure 1:
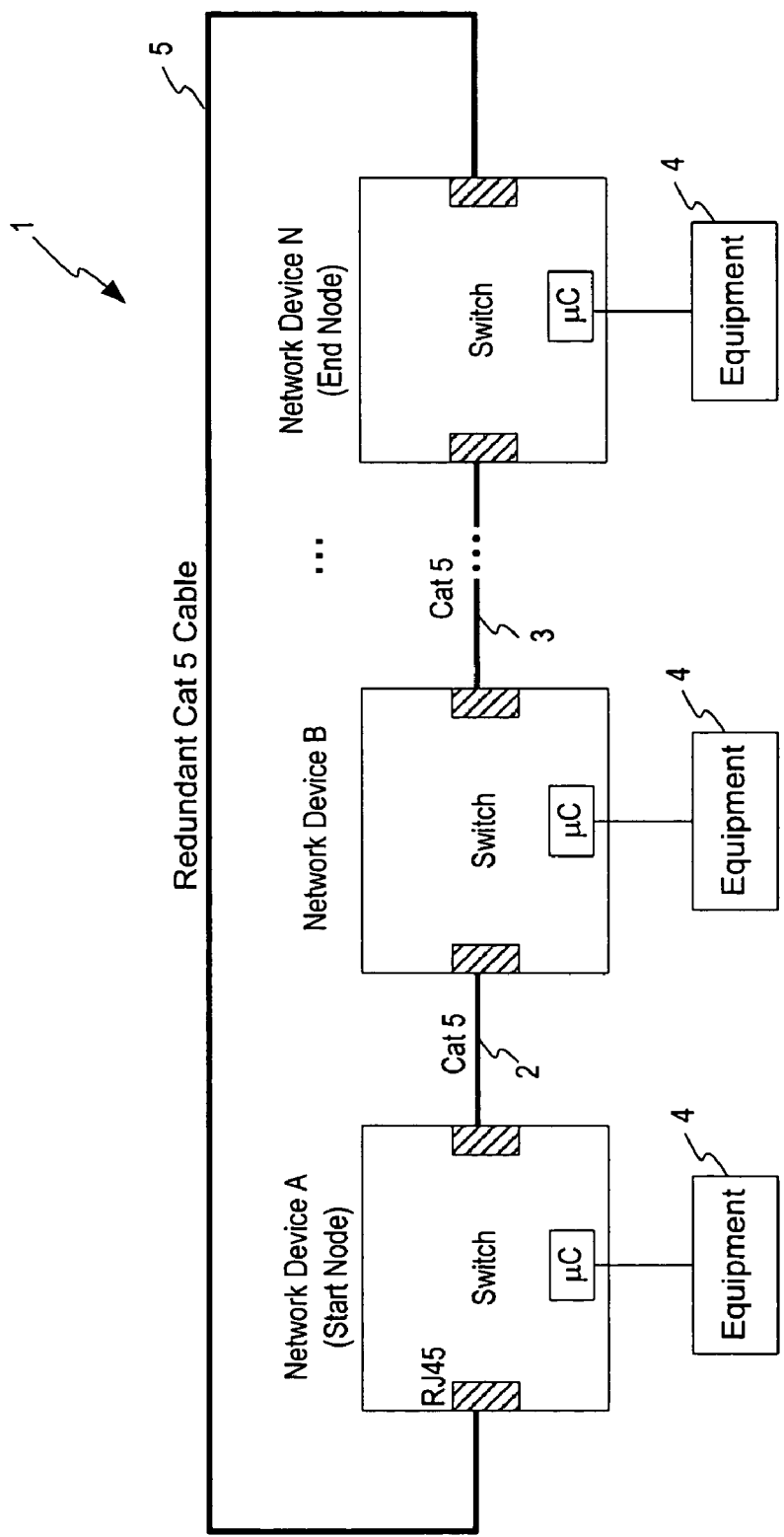
FIG. 1 illustrates a conventional daisy chain Ethernet environment where a number of network devices are daisy-chained together to enable data communications to flow between the start node (network device A) and the end node (network device N).

In accordance with the principles of the present invention, a redundant loop is formed in a daisy chain local area network (LAN) by making use of the unused twisted wire pairs in the single Category 5 (Cat 5) cable connecting adjacent network devices. A passive signal path is formed in each network device to connect the unused twisted wire pairs from an upstream port to a downstream port. In one embodiment, the redundant loop is completed by using a loop back connector at the terminal network devices where the unused twisted wire pairs are coupled back to the used twisted wire pairs to form a loop. In another embodiment, a terminal network device is implemented using a multi-port layer 2 switching device where the unused twisted wire pairs are looped back to the used twisted wire pairs through the switching device to complete the redundant loop. A Spanning Tree Protocol is then implemented at each network device to establish an active signal path in the LAN. By making use of the unused twisted wire pairs of the existing Cat 5 cable, redundancy can be implemented in the local area network without using an additional cable connecting the first network device (the start node) to the last network device (the end node) in the LAN.

The network redundancy method of the present invention is applicable in daisy chain local area network using Cat 5 cabling. In one embodiment, the network redundancy method of the present invention is implemented in a daisy chain 10Base-T or 100Base-TX Ethernet that calls for Cat 5 cabling. In the following description, the local area network in which the network redundancy method of the present invention is implemented will be referred to as an Ethernet but one of ordinary skill in the art would appreciate that the method of the present invention can be applied to local area networks implemented using network architectures other than Ethernet as long as the network architecture utilizing Cat 5 cabling.

The network redundancy method of the present invention when applied to a daisy chain local area network, such as an Ethernet, provides many advantages over conventional redundancy solutions.

First, redundancy is provided using a single Cat 5 cable between adjacent network devices. The additional Cat 5 cabling connecting the end node back to the start node required by the conventional solution is not needed. Such additional cabling is undesirable for the reasons stated above.

Second, the network redundancy method of the present invention realizes an easily scaleable daisy chain architecture. For instance, a network device can be added or subtracted from the daisy chain by moving the loop back connector. The network redundancy method of the present invention provides scalability without regard to limitations imposed by the conventional solutions, such as limitations of cable length.

Finally, the network redundancy method of the present invention renders daisy chain 10Base-T or 100Base-TX Ethernet a viable alternative to short run (less than 100 m start to end node) multi-drop serial link networks.

The network redundancy method of the present invention is implemented in network devices interconnected by Cat 5 cabling to form a local area network. In the present description, "network devices" refer to data network infrastructure elements, such as switches, hubs, gateways, bridges or routers, that have multiple ports for interconnecting data links on a data network. In an IEEE 802 LAN (such as an Ethernet), the network devices are usually layer 2 devices such as layer 2 switches and transparent multi-port bridges. In an IEEE802 LAN, layer 2 is the data link layer and thus a layer 2 device can also be referred to as a data link layer device. Bridges are multi-port devices that allow simultaneous communication between nodes coupled to the ports of the bridge. A switch has multiple paths between each input-output port pair.

Figure 2:
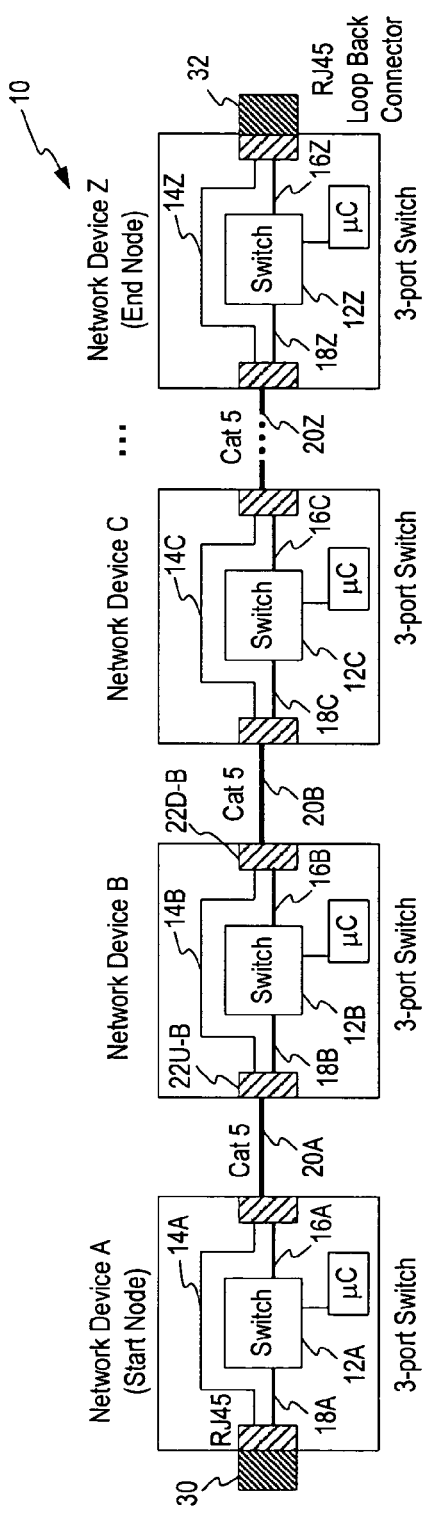
FIG. 2 is a schematic diagram of a daisy chain Ethernet implementing the network redundancy method according to one embodiment of the present invention.

FIG. 2 is a schematic diagram of a daisy chain Ethernet implementing the network redundancy method according to one embodiment of the present invention. In the present embodiment, Ethernet 10 is implemented as a 10Base-T or 100Base-TX Ethernet. Referring to FIG. 2, Ethernet 10 includes multiple network devices A to Z connected in a daisy chain structure with network device A as the start node of the daisy chain and network device Z as the end node. In the present embodiment, each of network devices A to Z is a 3-port switch. In other embodiments, the network devices can be implemented using other layer 2 devices. To form Ethernet 10, network devices A to Z are interconnected using Cat 5 cables 20A to 20Z. Specifically, each adjacent pair of network devices is interconnected using a single Cat 5 cable. Thus, network device A is connected by cable 20A to network device B while network device B is connected by cable 20B to network device C and so on. The Cat 5 cables are coupled to the RJ45 connectors (or RJ45 jacks) of the network devices. For example, RJ45 jack 22U-B and RJ45 jack 22D-B are the two RJ45 connectors associated with network device B. It is well understood in the art that each RJ45 connector includes eight pins, each pin for connecting one wire of the four twisted wire pairs of the Cat 5 cable.

Figure 3:
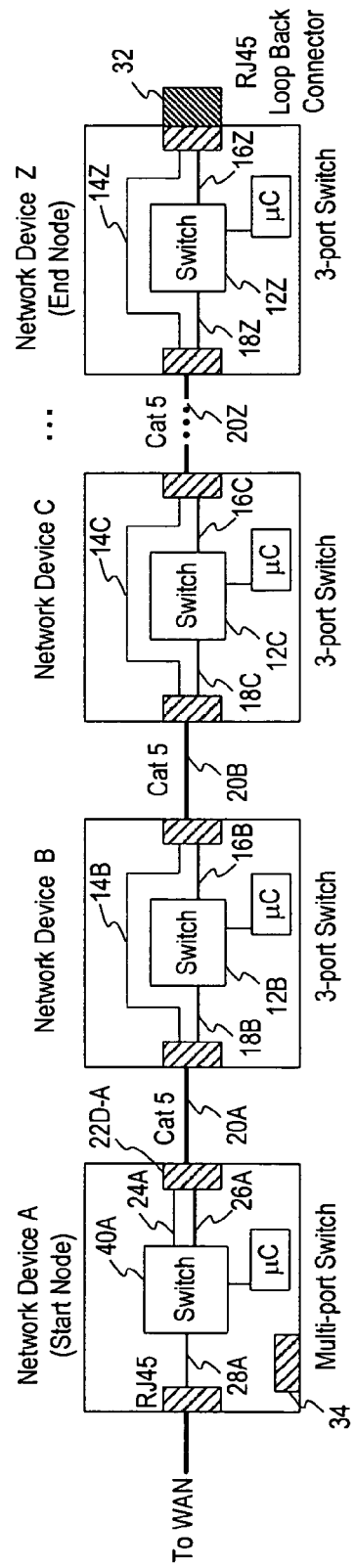
FIG. 3 is a schematic diagram of a daisy chain Ethernet implementing the network redundancy method according to a second embodiment of the present invention.

In the present embodiment, each network device in Ethernet 10 is implemented using a 3-port switch to provide connectivity from an upstream port to a downstream port, as well as to the local processor. Referring to FIG. 3, in network device B, a 3-port switching device 12B provides a first data port for connecting to the upstream port (RJ45 connector 22U-B) coupled to cable 20A and a second data port for connecting to the downstream port (RJ45 connector 22D-B) coupled to cable 20B. A third data port of 3-port switching device 12B is coupled to a local microprocessor or a microcontroller (μC) to perform local device functions. The interface to the microprocessor is typically a MII, SMI, SPI, 8/16/32 bit generic processor interface, or a PCI interface. For example, the local microprocessor (μC) can be coupled to control a machine station in an assembly line where the local microprocessor receives data from or sends data to the network through layer 2 switching device 12B.

The network redundancy method of the present invention is usually implemented in "managed" layer 2 devices where the microprocessor can operate to program the device, such as through a SPI interface. In one embodiment, the 3-port switching device in each of network devices A to Z of Ethernet 10 is implemented using an Integrated 3-port 10/100 Managed Switch, Part no. KS8993M, available from Micrel, Inc., San Jose, Calif.

In a daisy chain of network devices, the network devices at the two ends of the daisy chain are the start node and end node of the daisy chain and are referred to herein as terminal network devices. In a conventional daisy chain Ethernet, the terminal network devices of the daisy chain not coupled to other networks are left unconnected. However, in accordance with the present invention, a RJ45 loop back connector in accordance with the present invention is used to implement a redundant signal loop, as will be described in more detail below.

As described above, a Category 5 cable includes four twisted wire pairs. In a 10Base-T or 100Base-TX Ethernet, only two of the four twisted wire pairs are normally used—a first pair is used for transmitting signals while a second pair is used for receiving signals. Thus, in a 10Base-T or 100Base-TX Ethernet using Cat 5 cabling, there will always be two twisted wire pairs that are normally left unused. In accordance with the present invention, the normally unused twisted wire pairs of the single Cat 5 cable connecting a pair of adjacent network devices are used to form a redundant signal path loop to provide redundancy. Accordingly, in Ethernet 10, redundancy is provided by connecting the unused twisted wire pairs of the Cat 5 cables through passive signal paths formed in each network device and by looping back the unused wire pairs at the terminal network devices (the start node and the end node) to form a redundant wire loop. A Spanning Tree Protocol is implemented at each network device to establish the active network paths through either the normally used wire pairs of the Cat 5 cables or the unused wire pairs of the same Cat 5 cables forming the redundant wire loop.

The two pairs of unused twisted wire pairs of each Cat 5 cable are connected through each network device by means of a passive signal path that is formed on each network device. Referring to FIG. 2, network device B in Ethernet 10 has an upstream port coupled to cable 20A. The two normally used pairs of cable 20A are connected by a signal path 18B from the upstream port (RJ45 jack 22U-B) to the first data port of 3-port switching device 12B. Signal path 18B includes multiple conductive traces connecting the pins of the RJ45 jack associated with the four wires of the two normally used twisted wire pairs from the upstream RJ45 jack to the first data port of switching device 12B. Similarly for the downstream port coupled to cable 20B, the two normally used pairs of cable 20B are connected by a signal path 16B from the downstream port (RJ45 jack 22D-B) to the second data port of 3-port switching device 12B. Signal path 16B also includes multiple conductive traces connecting the pins of the RJ45 jack associated with the four wires of the two normally used twisted wire pairs from the downstream RJ45 jack to the second data port of switching device 12B.

In network device B, a passive signal path 14B is formed to connect the unused twisted wire pairs of cable 20A coupled to the upstream port to the unused twisted wire pairs of cable 20B coupled to the downstream port. Passive signal path 14B also includes multiple metal traces connecting the four wires of the two normally unused twisted wire pairs from the upstream RJ45 jack to the downstream RJ45 jack. In this manner, the normally unused twisted wire pairs of the Cat 5 cables connected to the network devices are connected through the network devices to form a redundant signal path.

Figure 4:
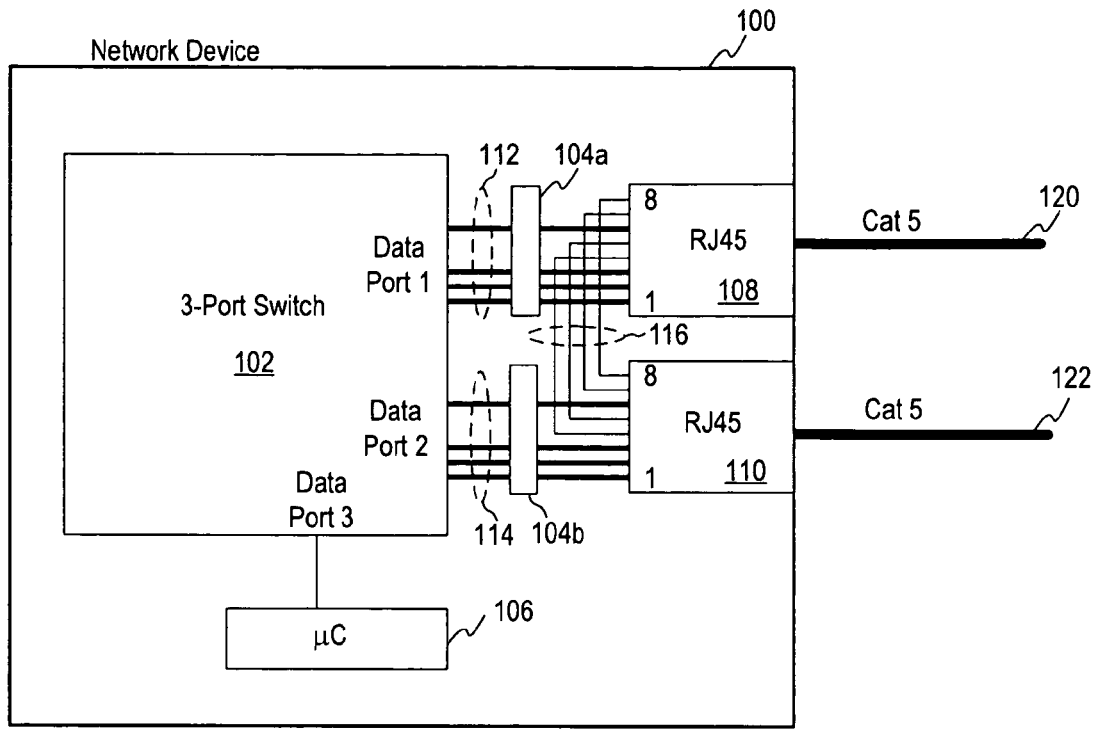
FIG. 4 is a detailed schematic diagram of a network device implementing the passive signal path according to one embodiment of the network redundancy method of the present invention.

FIG. 4 is a detailed schematic diagram of a network device implementing the passive signal path according to one embodiment of the network redundancy method of the present invention. Referring to FIG. 4, a network device 100 is representative of network devices A to Z in FIG. 2. Network device 100 includes a 3-port switching device 102 where a first data port (Data Port 1) is connected to an upstream port (RJ45 jack 108) and a second data port (Data Port 2) is connected to a downstream port (RJ45 jack 110). A third data port (Data Port 3) is connected to a microcontroller 106 to provide application specific functions. A Cat 5 cable 120 is coupled to the upstream RJ45 jack 108 while another Cat 5 cable 122 is coupled to the downstream RJ45 jack 110. The normally used twisted wire pairs of cable 120 are connected by signal path 112, through magnetic 104a, to the first data port of switch 102. The normally used twisted wire pairs of cable 122 are connected by signal path 114, through magnetic 104b, to the second data port of switch 102. Each of signal paths 112 and 114 includes 4 conductive traces corresponding to the four wires in the two twisted wire pairs. Meanwhile, a passive signal path 116 is formed to connect the normally unused twisted wire pairs from the upstream RJ45 jack 108 to the downstream RJ45 jack 110. In the present embodiment, passive signal path 116 interconnects the twisted wire pairs of the two cables before the magnetic. Therefore, passive signal path 116 does not go through the magnetic components of network device 100.

In the 10Base-T or 100Base-TX Ethernet architecture, the normally unused twisted wire pairs are pins 4, 5, 7 and 8 of the RJ45 jack. Thus, when network device 100 is implemented in a 10Base-T or 100Base-TX Ethernet network, pin 8 of the upstream port is connected to pin 8 of the downstream port, pin 7 to pin 7, pin 5 to pin 5, and pin 4 to pin 4, respectively, to form the passive signal path 116. In this manner, the unused twisted wire pairs of the upstream cable 120 are connected through network device 100 to the downstream cable 122 to provide a redundant signal path.

Returning to FIG. 2, in Ethernet 10, the other network devices A to Z are configured in the same manner as network device B so that passive signal paths 14A to 14Z connect the normally unused twisted wire pairs of the Cat 5 cables through the entire network. At each of the terminal network devices A and Z, that is, the start node and the end node, a loop back connection is implemented to connect the normally unused twisted wire pairs back to the normally used twisted wire pairs to complete the redundant loop. In the present embodiment, a passive loop back method is used for the loop back connection whereby the loop back connectivity is realized using a RJ45 loop back connector which connects the normally used wire pairs at the port to the normally unused wire pairs. In Ethernet 10, RJ45 loop back connector 30 is coupled to the upstream port of network device A (the start node) while RJ45 loop back connect 32 is coupled to the downstream port of network device Z (the end node).

Figure 5:
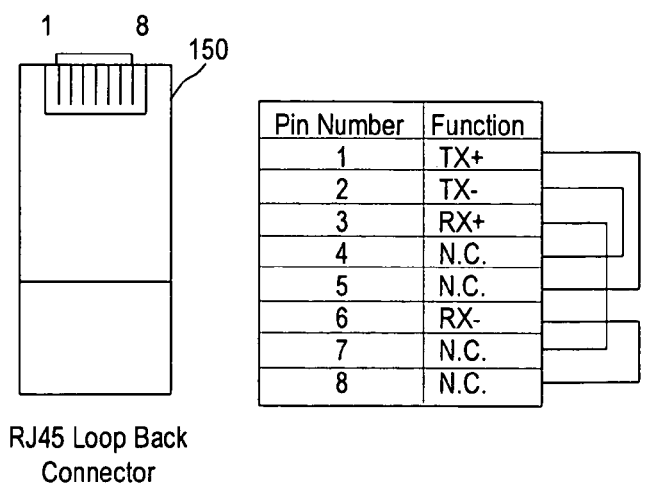
FIG. 5 is a block diagram and pin connection table for a RJ45 loop back connector which can be used to implement the passive loop back method according to one embodiment of the present invention.

FIG. 5 is a block diagram and pin connection table for a RJ45 loop back connector which can be used to implement the passive loop back method according to one embodiment of the present invention. Referring to FIG. 5, a RJ45 loop back connector 150 is constructed as a RJ45 male connector including pins 1-8 representing the four twisted wire pairs contained in a Cat 5 cable. In the present embodiment, it is assumed that RJ45 loop back connector 150 is to be applied in a 10Base-T or 100Base-TX Ethernet architecture. In that case, pins 1, 2, 3 and 6 are the normally used pins (TX+, TX−, RX+, RX−) while pins 4, 5, 7 and 8 are the normally unused pins (N.C.). Inside RJ45 loop back connector 150, conductive traces connect each of the normally used pin to one of the normally unused pins. In the present embodiment, pin 1 is electrically shorted to pin 5, pin 2 is electrically shorted to pin 4, pin 3 is electrically shorted to pin 7, and pin 6 is electrically shorted to pin 8. Other connection configurations are possible and the loop back configuration of FIG. 5 is illustrative only. By constructing a loop back connector as shown in FIG. 5, a redundant loop can be formed in the Ethernet of FIG. 2 using the unused twisted wire pairs of the existing cables connecting the network devices.

According to another embodiment of the present invention, an active loop back method for providing loop back connectivity at the terminal nodes can be used and is illustrated in FIG. 3. Like elements in FIGS. 2 and 3 are given like reference numerals to simplify the discussion. In Ethernet 20 of FIG. 3, network device A is implemented as a multi-port Ethernet switch using multi-port switching device 40A. In one embodiment, multi-port switching device 40A is a 5-port Managed Ethernet switch, Part No. KS8995MA, available from Micrel, Inc., San Jose, Calif.

Referring to FIG. 3, in network device A, a passive signal path 24A connected to the pins of RJ45 connector 22D-A associated with the normally unused twisted wire pairs of cable 20A is terminated into a data port of multi-port switching device 40A. The normally used twisted wire pairs of cable 20A are connected through signal path 26A to another data port of multi-port switching device 40A. A microprocessor (μC) providing application specific function is coupled to a third data port of multi-port switching device 40A. If connection to a wide area network or a broadband network is desired, a WAN connection can be made at the upstream port, through signal path 28A, to a broadband data port of multi-port switching device 40A. The WAN connection is optional and is not a required feature of the network redundancy method of the present invention. By using a multi-port switching device, passive signal path 24A can be connected to signal path 26A through the switching fabric of switching device 40A.

The active loop back method of FIG. 3 requires the use of a unique terminal node (start node or end node). That is, the terminal node must be a multi-port network device including a data port available for the unused twisted wire pair. Therefore, when new network device is to be added to Ethernet 20, the new device should be added downstream to network device A to preserve the active loop back connectivity implemented in the terminal network device A.

In Ethernet 20, the end node (network device Z) is implemented in the same manner as the end node in Ethernet 10 and uses a RJ45 loop back connector for passive loop back connectivity. In other embodiments, the end node can also implement the active loop back method of network device A by using a multi-port switching device for network device Z. In that case, when new devices are to be added to Ethernet 20, the new devices should be added upstream to network device Z and downstream of network device A.

In contrast to the active loop back method requiring a unique terminal node, the passive loop back method of FIG. 2 does not require a unique terminal node. Instead, the terminal node can be the same network device as the other nodes in the daisy chain. As a result, the passive loop back method using a RJ45 loop back connector implements an easily scalable architecture. To add or subtract a network device in the daisy chain, a single CAT5 cable with a network device is either added or subtracted from the network and the RJ45 loop back connector is placed at the downstream port of the last network device in the daisy chain or the upstream port of the first network device in the daisy chain.

When the network redundancy method of the present invention is implemented in the daisy chain Ethernet of FIG. 2 or 3, a signal path loop is formed between the network devices. For an Ethernet network to function properly, only one active signal path can exist between two nodes in the network. Thus, when a loop is implemented in a network for redundancy purposes, a Spanning Tree Protocol is implemented at each of the network device to serve two main purposes. First, the Spanning Tree Protocol establishes a single active signal path between two nodes in the network to prevent an undesirable loop in the network when all network devices are functioning properly. Second, the Spanning Tree Protocol establishes communications with downstream nodes when a network device in the daisy chain fails.

In the present embodiment, the Spanning Tree protocol under IEEE 802.1d standard is implemented in the network devices of Ethernet 10 and 20. IEEE 802.1d Spanning Tree Protocol is a link management protocol that prevents undesirable loops in a network that includes signal path redundancy. In operation, Spanning Tree Protocol defines a tree that spans all switches in a network and forces certain redundant signal paths into a standby (or blocked) state. If a network segment in the Spanning Tree Protocol fails, such as when a network device malfunctions, the Spanning Tree algorithm operates to reconfigures the spanning tree topology and reestablishes the failed link by activating the standby path. Spanning Tree Protocol also reconfigures the spanning tree topology under other circumstances, such as when the costs associated with certain network segments change. Spanning Tree Protocol may then reconfigure the spanning tree topology to make use of network links with the minimum cost values.

Thus, referring to Ethernet 10 of FIG. 2, by utilizing IEEE 802.1d Spanning Tree Protocol, if any single network device in the daisy chain between the start node (network device A) and the end node (network device Z) loses power or fails, communications with network devices downstream from the failed network device are sustained via the unused twisted wire pairs in the Cat 5 cables and the passive signal path routed through each of the network devices. In this manner, redundancy in Ethernet 10 is implemented without the requirement for an extra Cat 5 cable from network device Z to network device A, as is required in the conventional solution.

The above detailed descriptions are provided to illustrate specific embodiments of the present invention and are not intended to be limiting. Numerous modifications and variations within the scope of the present invention are possible. For example, the above descriptions provide two methods for implementing the loop back connection at the terminal network devices—the passive loop back method using a RJ45 loop back connector and the active loop back method using a multi-port switch, one of ordinary skill in the art would appreciate that other methods for providing the loop back connectivity at the terminal network devices are possible. The only loop back connection requirement in the network redundancy method of the present invention is that the normally unused twisted wire pairs are connected back to the normally used twisted wire pairs at the terminal network devices.

Furthermore, in the above descriptions, the passive signal paths for connecting the normally unused twisted wire pairs from the upstream port to the unused twisted wire pairs of the downstream port are shown as being implemented in a 3-port switch. One of ordinary skill in the art would appreciate that the passive signal paths can be implemented in any multi-port network devices. When a multi-port network device, such as a 4-port or a 5-port switch, is connected in a daisy chain, the multi-port network device will have an upstream port and a downstream port between which the passive signal path can be implemented to connect the normally unused twisted wire pairs. The present invention is defined by the appended claims.

I claim:

1. A daisy chain local area network employing Category 5 (Cat 5) cabling for connecting network devices, the local area network providing communications over two twisted wire pairs (the "normally used" twisted wire pairs) of the Cat 5 cabling connecting the network devices, leaving two twisted wire pairs of the Cat 5 cabling unused (the "normally unused" twisted wire pairs), the daisy chain local area network comprising:

a plurality of network devices connected in a daisy chain configuration between first and second terminal network devices, the first and second terminal network devices being network devices at the two ends of the daisy chain of network devices, each adjacent pair of network devices and terminal network devices being connected by a single Cat 5 cable, each of the plurality of network devices comprising:

an upstream port and a downstream port, each of the ports being coupled to a Cat 5 cable, each of the ports having pins associated with the normally used twisted wire pairs and the normally unused twisted wire pairs of the Cat 5 cable; and a passive signal path connecting the pins of the upstream port associated with the normally unused twisted wire pairs of the Cat 5 cable to the pins of the downstream port associated with the normally unused twisted wire pairs of the Cat 5 cable; and a loop back connection coupled to each of the first and second terminal network devices, the loop back connection being operative to electrically connect the normally used twisted wire pairs to the normally unused twisted wire pairs of the Cat 5 cable connected to the respective first and second terminal network devices, wherein the passive signal paths through the plurality of network devices and the loop back connections of the first and second terminal network devices form a redundancy loop in the local area network and a Spanning Tree Protocol is implemented in each of the plurality of network devices and the first and second terminal network devices for defining an active signal path through the local area network.

2. The daisy chain local area network of claim 1, wherein at least one of the first and second terminal network devices comprises:

an upstream port and a downstream port, at least one of the ports being coupled to a Cat 5 cable, each of the ports having pins associated with the normally used twisted wire pairs and the normally unused twisted wire pairs of the Cat 5 cable;

a passive signal path connecting the pins of the first upstream port associated with the normally unused twisted wire pair of the Cat 5 cable to the pins of the downstream port associated with the normally unused twisted wire pair of the Cat 5 cable; and a loop back connector coupled a first port being the port of the terminal network device not coupled to the Cat 5 cable, the loop back connector connecting the pins of the first port associated with the normally used twisted pairs of a Cat 5 cable to the pins of the first port associated with the normally unused twisted pairs of a Cat 5 cable.

3. The daisy chain local area network of claim 1, wherein at least one of the first and second terminal network devices comprises a multi-port switching device having a plurality of data ports coupled to a switching fabric, the at least one of the first and second terminal network devices comprising:

a first port being coupled to a Cat 5 cable, the first port having pins associated with the normally used twisted wire pairs and the normally unused twisted wire pairs of the Cat 5 cable;

a first signal path connecting the pins of the first port associated with the normally unused twisted wire pairs of the Cat 5 cable to a first data port of the multi-port switching device; and a second signal path connecting the pins of the first port associated with the normally used twisted wire pairs of the Cat 5 cable to a second data port of the multi-port switching device, wherein the normally unused twisted wire pairs of the Cat 5 cable is electrically connected to the normally used twisted wire pairs through the switching fabric of the multi-port switching device to implement the loop back connection at the at least one of the first and second terminal network devices.

4. The daisy chain local area network of claim 1, wherein the plurality of network devices and the first and second terminal network devices comprise switches having three or more ports.

5. The daisy chain local area network of claim 1, wherein the plurality of network devices and the first and second terminal network devices comprise switches, hubs, gateways, bridges or routers.

6. The daisy chain local area network of claim 1, wherein the local area network comprises a 10BaseT or 100BaseTX Ethernet network.

7. The daisy chain local area network of claim 6, wherein the plurality of network devices and the first and second terminal network devices comprise layer 2 devices.

8. The daisy chain local area network of claim 6, wherein the plurality of network devices and the first and second terminal network devices comprise layer 2 switches having three or more ports.

9. The daisy chain local area network of claim 1, wherein the passive signal path in each of the plurality of network devices connects the respective pins of the upstream port to the respective pins of the downstream port without going through the magnetic components in the network device.

10. The daisy chain local area network of claim 1, wherein the Spanning Tree Protocol comprises the IEEE 802.1d Spanning Tree Protocol.

11. A method for providing redundancy in a daisy chain local area network employing Category 5 (Cat 5) cabling for connecting network devices, the local area network providing communications over two twisted wire pairs (the "normally used" twisted wire pairs) of the Cat 5 cabling connecting the network devices, leaving two twisted wire pairs of the Cat 5 cabling unused (the "normally unused" twisted wire pairs), the method comprising:

providing a plurality of network devices connected in a daisy chain configuration between first and second terminal network devices, the first and second terminal network devices being network devices at the two ends of the daisy chain of network devices, each adjacent pair of network devices and terminal network devices being connected by a single Cat 5 cable;

forming in each of the plurality of network devices a passive signal path connecting pins of an upstream port of the respective network device associated with the normally unused twisted wire pairs of the Cat 5 cable to pins of a downstream port of the respective network device associated with the normally unused twisted wire pairs of the Cat 5 cable;

forming a loop back connection at each of the first and second terminal network devices, the loop back connection being operative to electrically connect the normally used twisted wire pairs to the normally unused twisted wire pairs of the Cat 5 cable connected to the respective first and second terminal network devices; and implementing a Spanning Tree Protocol in each of the plurality of network devices and the first and second terminal network devices for defining an active signal path through the local area network.

12. The method of claim 11, wherein forming a loop back connection at each of the first and second terminal network devices comprises:

forming in at least one of the first and second terminal network devices a passive signal path connecting pins of an upstream port of the respective terminal network device associated with the normally unused twisted wire pairs of the Cat 5 cable to pins of a downstream port of the respective terminal network device associated with the normally unused twisted wire pairs of the Cat 5 cable; and at a first port being the port of the terminal network device not coupled to the Cat 5 cable, connecting the pins of the first port associated with the normally used twisted pairs of the Cat 5 cable to the pins of the first port associated with the normally unused twisted pairs of the Cat 5 cable.

13. The method of claim 11, wherein forming a loop back connection at each of the first and second terminal network devices comprises:

implementing in at least one of the first and second terminal network devices a multi-port switching device having a plurality of data ports coupled to a switching fabric;

coupling a first port of the at least one of the first and second terminal network devices to a Cat 5 cable, the first port having pins associated with the normally used twisted wire pairs and the normally unused twisted wire pairs of the Cat 5 cable;

forming a first signal path connecting the pins of the first port associated with the normally unused twisted wire pairs of the Cat 5 cable to a first data port of the multi-port switching device;

forming a second signal path connecting the pins of the first port associated with the normally used twisted wire pairs of the Cat 5 cable to a second data port of the multi-port switching device; and connecting the normally unused twisted wire pairs of the Cat 5 cable to the normally used twisted wire pairs through the switching fabric of the multi-port switching device to implement the loop back connection at the at least one of the first and second terminal network devices.

14. The method of claim 11, wherein the plurality of network devices and the first and second terminal network devices comprise switches having three or more ports.

15. The method of claim 11, wherein the plurality of network devices and the first and second terminal network devices comprise switches, hubs, gateways, bridges or routers.

16. The method of claim 11, wherein the local area network comprises a 10BaseT or 100BaseTX Ethernet network.

17. The method of claim 16, wherein the plurality of network devices and the first and second terminal network devices comprise layer 2 devices.

18. The method of claim 16, wherein the plurality of network devices and the first and second terminal network devices comprise layer 2 switches having three or more ports.

19. The method of claim 11, wherein forming in each of the plurality of network devices a passive signal path comprises:

connecting pins of an upstream port of the respective network device associated with the normally unused twisted wire pairs of the Cat 5 cable to pins of a downstream port of the respective network device associated with the normally unused twisted wire pairs of the Cat 5 cable without going through the magnetic components in the network device.

20. The method of claim 11, wherein the Spanning Tree Protocol comprises the IEEE 802.1d Spanning Tree Protocol.

* * * * *

UNITED STATES PATENT AND TRADEMARK OFFICE
CERTIFICATE OF CORRECTION

| | | |
|---|---|---|
| PATENT NO. | : 7,433,302 B2 | |
| APPLICATION NO. | : 11/123325 | |
| DATED | : October 7, 2008 | |
| INVENTOR(S) | : Robert J. Allen | |

It is certified that error appears in the above-identified patent and that said Letters Patent is hereby corrected as shown below:

Column 9, line 27, Claim 1: Cancel "two" and substitute --the two normally used--.

Column 9, line 28, Claim 1: Cancel "(the "normally used" twisted wire pairs)".

Column 9, line 29, Claim 1: Cancel "two" and substitute --two normally unused--.

Column 9, line 30, Claim 1: Cancel "of" and substitute --in--.

Column 9, lines 30 and 31, Claim 1: Cancel "(the "normally unused" twisted wire pairs)".

Column 9, line 31, Claim 1: Cancel "the daisy" and substitute --the two normally used twisted wire pairs being associated with pins 1, 2, 3 and 6 of an RJ45 connector and the two normally unused twisted wire pairs being associated with pins 4, 5, 7 and 8 of the RJ45 connector, the daisy--.

Column 11, line 2, Claim 11: Cancel "two" and substitute --the two normally used--.

Column 11, lines 2 and 3, Claim 11: Cancel "(the "normally used" twisted wire pairs)".

Column 11, line 4, Claim 11: Cancel "two" and substitute --two normally unused--.

Column 11, line 4, Claim 11: Cancel "of" and substitute --in--.

UNITED STATES PATENT AND TRADEMARK OFFICE
CERTIFICATE OF CORRECTION

PATENT NO.        : 7,433,302 B2
APPLICATION NO.   : 11/123325
DATED             : October 7, 2008
INVENTOR(S)       : Robert J. Allen It is certified that error appears in the above-identified patent and that said Letters Patent is hereby corrected as shown below:

Column 11, line 5, Claim 11: Cancel "unused (the "normally unused" twisted wire pairs)," and substitute --unused, the two normally used twisted wire pairs being associated with pins 1, 2, 3 and 6 of an RJ45 connector and the two normally unused twisted wire pairs being associated with pins 4, 5, 7 and 8 of the RJ45 connector,--.

Signed and Sealed this

Twenty-sixth Day of May, 2009

JOHN DOLL
*Acting Director of the United States Patent and Trademark Office*